Patented Nov. 26, 1935

2,021,986

UNITED STATES PATENT OFFICE

2,021,986

PRODUCTION OF PURE LITHIUM COMPOUNDS FROM IMPURE SOLUTIONS

Henry Seymour Colton, Shaker Heights, Ohio, assignor to The Grasselli Chemical Company, Cleveland, Ohio, a corporation of Delaware No Drawing. Application January 20, 1934, Serial No. 707,617

2 Claims. (Cl. 23—31)

This invention relates to the production of pure lithium salts from impure solutions of lithium compounds by preferentially precipitating the lithium as silicate from the solution of impurities and, after separating the lithium silicate from the solution, treating the silicate to produce desirable commercial salts of lithium. The processes of my invention are suitable for separating lithium compounds from other alkali metal compounds.

The impure solutions of lithium compounds from which I procure pure lithium compounds may be made in any desired manner. Ordinarily I utilize solutions obtained by the treatment of lithium bearing ores with agents which convert the lithium to water soluble compounds. Prior to treatment according to my processes the solutions should be treated to remove any aluminum and heavy metal compounds, if such are present. Usually the solutions which I use contain lithium, sodium, and potassium as sulfates, chlorides, hydroxides, etc.

In order to explain more fully how my invention is used in practice, the following specific example is given:

A solution of lithium, sodium, and potassium hydroxides was run into a suitable tank and there treated with sodium metasilicate. The lithium formed an insoluble metasilicate and precipitated. The sodium and potassium hydroxides did not take part in the reaction and were left in solution.

I filtered the solution and removed the filter cake to a treating tank where the lithium silicate was converted to lithium chloride by treatment with hydrochloric acid. The soluble lithium chloride was then filtered from the insoluble silica formed by the reaction.

This lithium chloride solution is relatively free from impurities, and in order to prepare a suitable lithium chloride in dry form I evaporated the solution in dryness. By using fairly concentrated hydrochloric acid, I am able to avoid the use of a greater volume of water than is needed to dissolve the lithium chloride. Consequently, no large amount of heat is required to evaporate the solution.

If other salts of lithium are desired, the lithium chloride solution may be suitably treated to produce such salts. For instance, the lithium may, if desired, be precipitated as lithium phosphate by the use of sodium phosphate. Or again, it could be precipitated as carbonate or fluoride by a treatment with sodium carbonate or fluoride.

Instead of using hydrochloric acid to dissolve the lithium silicate, I may use other suitable acids such as sulfuric, nitric, acetic, etc., which react with lithium to form soluble lithium salts. When such acids are used I obtain lithium sulfate, nitrate, acetate, etc. as a product. These products as in the case of lithium chloride, may, if desired, be further treated.

While I have specifically mentioned using sodium metasilicate in the precipitation of lithium as silicate, other water soluble silicates may be used. I may, for example, use potassium or ammonium metasilicates. Again, I may use sodium potassium, or ammonium orthosilicate. In general, I use the soluble silicates of commerce. Specifically speaking, I prefer to use water soluble alkali metal silicates.

I claim:

1. In a process of treating a solution which contains lithium, sodium, and potassium compounds to recover substantially all of the lithium values, the steps comprising, treating the solution with an alkali metal silicate to precipitate lithium silicate, separating the precipitated lithium silicate from the solution of soluble sodium and potassium compounds, treating the lithium silcate with an acid which will react with lithium to form soluble lithium salts, and separating the solution of soluble lithium salt from the insoluble precipitate.

2. In a process of treating a solution which contains lithium, sodium, and potassium compounds to recover substantially all of the lithium values, the steps comprising, treating the solution with sodium metasilicate to precipitate lithium silicate, separating the precipitated lithium silicate from the solution of soluble sodium and potassium compounds, treating the lithium silicate with hydrochloric acid to convert the lithium silicate to lithium chloride, and separating the lithium chloride solution from the insoluble precipitate.

HENRY SEYMOUR COLTON.